July 6, 1937.  H. D. SMITH  2,086,480
PNEUMATIC CUSHIONING DEVICE
Filed Feb. 20, 1936   2 Sheets-Sheet 1

INVENTOR
*Herschel D. Smith*
BY
*Lucian E. Jackson*
ATTORNEY

July 6, 1937.　　　　　H. D. SMITH　　　　　2,086,480
PNEUMATIC CUSHIONING DEVICE
Filed Feb. 20, 1936　　　2 Sheets-Sheet 2
FIG. 9.
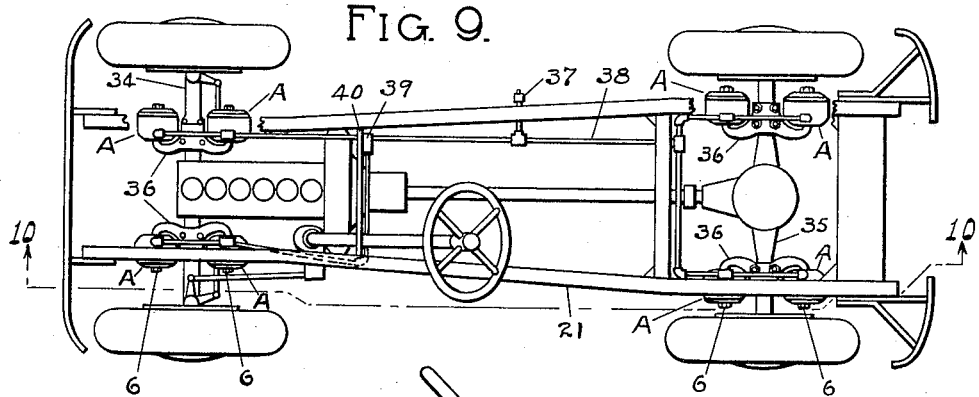
FIG. 10.
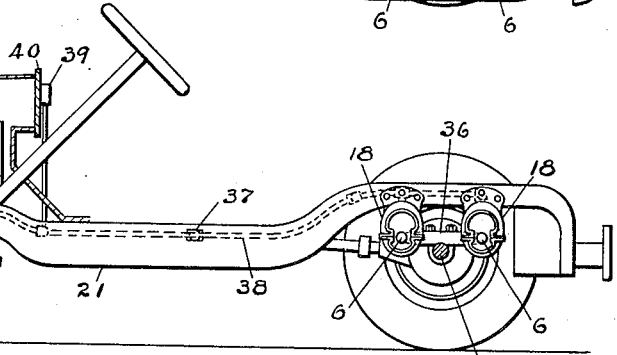
FIG. 13.
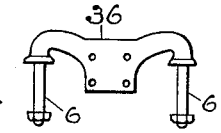
FIG. 14.
FIG. 11.
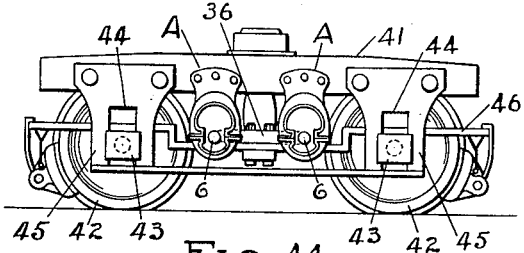
FIG. 12.
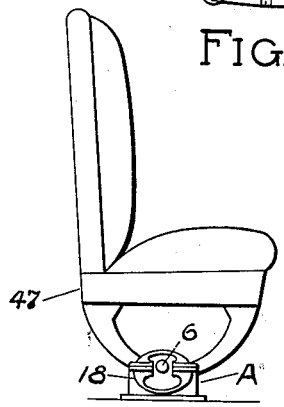
INVENTOR
Herschel D. Smith
BY
Lucian C. Jackson
ATTORNEY Patented July 6, 1937

2,086,480

UNITED STATES PATENT OFFICE 2,086,480

PNEUMATIC CUSHIONING DEVICE

Herschel D. Smith, Buffalo, N. Y., assignor of one-half to Harris P. Richardson, Buffalo, N. Y.

Application February 20, 1936, Serial No. 64,844

12 Claims. (Cl. 267—35)

This invention relates to an air cushioning device which can be used to take the place of springs and is a continuation-in-part of my application Ser. No. 736,536, filed July 23, 1934, for Pneumatic automobile springs, issued February 25, 1936, Ser. No. 2,031,862.

This invention relates to a resilient pneumatic structure to take the place of springs, as in a chair, and particularly to means for resiliently supporting the body of a vehicle on its axles in place of the present metal springs. The pneumatic structure in this invention is of the type of a closed vessel for holding air and connected to two relatively moving parts, one of said parts connected to an outer enclosing casing and the other of said parts connected through a partition in said vessel whereby the cushioning effect between said relatively moving parts is accomplished by displacing said partition in relation to the outer wall of said vessel.

One object of the present invention is to provide resilient supporting or suspension means for bodies which will function quietly in a floating manner and having no metal to metal contact does away with squeaks while requiring no lubrication.

Another object is to provide a pneumatic spring support, the resilience of which can be varied at will.

Another object is to provide pneumatic means for springing and carrying a vehicle body and absorbing shocks and vibration while providing body stability.

Other objects will appear as the description proceeds.

In the drawings accompanying and forming a part of this specification:

Fig. 9 is a plan of an automobile chassis with one side frame member cut away at the front axle and at the rear axle to show my pneumatic cushioning device as mounted in pairs to take the place of the ordinary springs. Also showing an air gauge and air connections for inflating the separate cushioning devices equally.

Fig. 10 is a side elevation of an automobile chassis with my devices installed as in Fig. 9 and section on line 10—10 of Fig. 9.

Fig. 11 is a side elevation of a car truck to illustrate a method of installing my cushioning device.

Fig. 12 is a side elevation of a chair to illustrate a method of installing my cushioning device.

Fig. 13 is a plan of a yoke for connecting my cushioning device in pairs to an axle.

Fig. 14 is a side elevation of the yoke as in Fig. 13.

Figure 1:
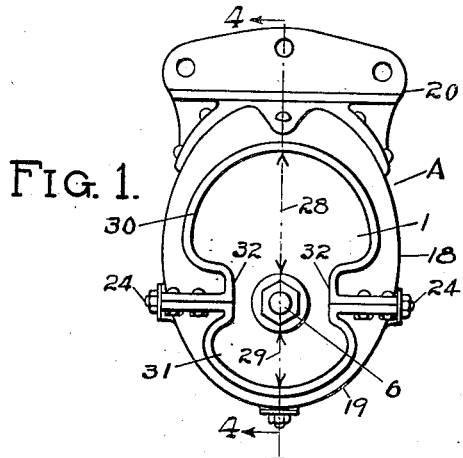
Figure 1 is a front elevation of my improved pneumatic cushioning device as assembled with an air container in its casing and a spindle through said air container.

My pneumatic cushioning device as a whole consists of a resilient air container enclosed in an outer metal casing and while this device is adapted to be used in various ways to cushion the movement of a moving part in relation to a fixed part it will first be described as being applied to an automobile, and being interposed between the automobile frame and axle the said outer metal casing is attached to the automobile frame and the air container connected to the axle by means of a spindle extending through an internal partition. It is to be understood that the invention is not to be limited to the uses here shown because it is adapted to resiliently support and absorb shocks between any two relatively moving parts, and one or more of the devices are employed to suit conditions.

Referring to the drawings, A is my cushioning device as a whole, and 1 the air container which is preferably made of rubber or of rubber and fabric. It will be understood that any suitable resilient material can be used in place of the rubber. The air container 1 as shown is a closed vessel and preferably of an elliptical shape as in Fig. 3 with a wall of substantially even thickness and somewhat flattened front and rear at 2, 2 as in Fig. 4, but it is to be understood that this shape may be varied to suit conditions.

Figure 4:
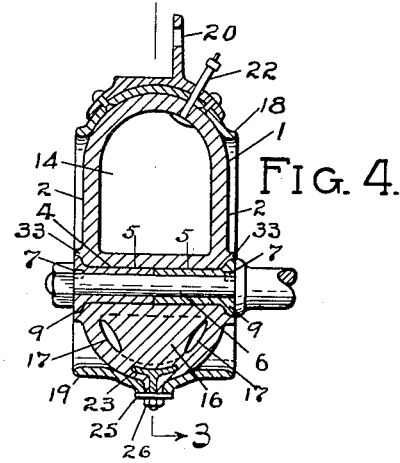
Fig. 4 is a sectional elevation on line 4—4 of Figs. 1 and 3.
Figure 5:
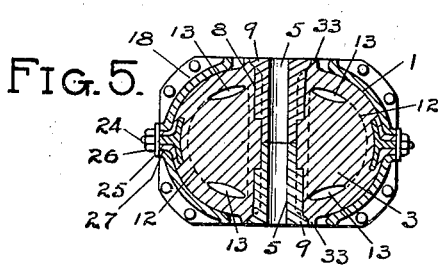
Fig. 5 is a sectional plan on line 5—5 of Fig. 3.
Figure 7:
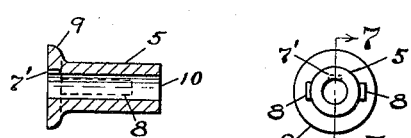
Fig. 7 is a section on line 7—7 of Fig. 8, of one-half of a spool, said complete spool shown assembled on a spindle in Fig. 4.
Figure 8:
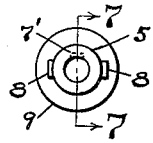
Fig. 8 is an end view of the one-half spool of Fig. 7.

At or about one third of the distance from the bottom of the air container 1 is provided a horizontal partition 3 having a hole 4 therethrough for mounting on a spool 5, 5 as shown in Figs. 4 and 5. The complete spool is made up of two similar halves, each designated as 5, and each half 5 as detailed in Figs. 7 and 8. Each half 5 is keyed to a spindle 6 by means of a key 7 and the keyway in 5 (Figs. 7 and 8) is indicated by 7'.

On the body of each half spool 5 are lugs 8, 8 extending from the flange 9 toward the end 10. These lugs 8 and 8 are shaped like keys and may extend from flange 9 to end 10 and fit into suitable recesses or keyways in the partition 3 so the air container 1 can prevent any tendency of the spindle 6 and spool 5, 5 to turn and so absorb any torque developed in driving the car. The end shifting of the spindle 6 is prevented by the flanges 9 and 9 on spool 5, 5.

Figure 3:
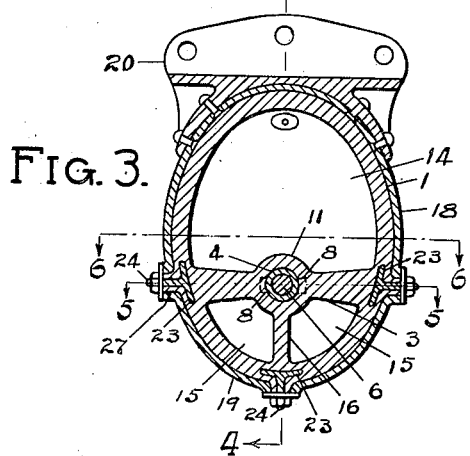
Fig. 3 is a sectional elevation on line 3—3 of Figs. 2 and 4.
Figure 6:
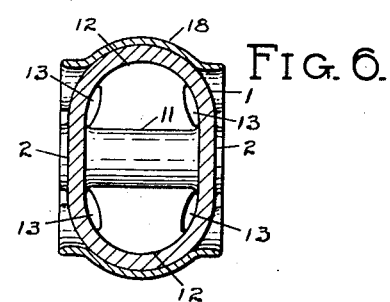
Fig. 6 is a sectional plan on line 6—6 of Fig. 3.

The partition 3 is enlarged near the center into a boss 11 to allow for the hole 4 therethrough. As shown in Fig. 3 the partition 3 is thickest at its connection to the container wall and tapers towards the boss 11. In Figs. 5 and 6 it will be noted that the partition 3 is connected to the container wall where the boss 11 contacts with the flattened portions 2 and 2 and at right angles thereto as at the contact lines 12 and 12. This leaves openings 13, 13, 13 and 13 where the partition 3 is not fastened to or is not continuous with the container wall. The partition 3 being separated from the container wall near the boss 11 by the four openings 13 allows a freer movement of said partition by means of the spindle 6 through said boss 11. The openings 13 also allow for the movement of air from the upper chamber 14 to the lower chambers 15, 15 and vice versa.

From the bottom of boss 11 extends a vertical partition 16 to the bottom wall of container 1 to form the two chambers 15, 15. Fig. 4 shows that the partition 16 is separated from the container wall by openings 17, 17 extending downward from near the boss 11 to allow air to circulate between chambers 15 and 15 and to allow for the free movement of the boss 11 in relation to the wall of the container 1.

Figure 2:
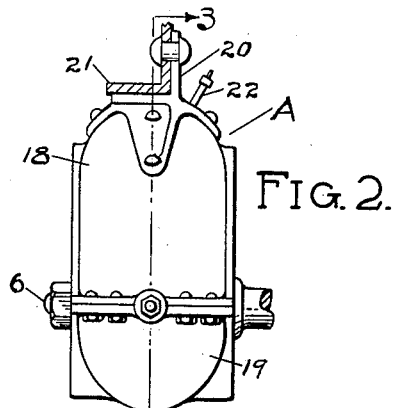
Fig. 2 is a side elevation of my device as in Fig. 1 and showing a portion of an angle iron or channel in section to which the casing of said device is fastened.

In Figs. 1 and 2 outside views of a casing 18 and cover 19 to enclose the air container 1 are shown, said bottom cover 19 fastened to the casing 18 in any convenient manner for assembling or removing said container 1. Fastened to the top of casing 18 is a bracket 20 as a means of attaching my cushioning device to the frame of an automobile, car truck, etc., represented by 21 in Figure 2.

22 is a tube connected into the container 1 (Figs. 2 and 4) for filling the chambers 14 and 15 with air to the amount of pressure desired. The tube 22 can be in the form of a valve stem for each of my devices A separately or when connected in multiple can be in the form of a tube to allow the air to circulate and maintain a common pressure between two or more devices A on a car. Tube 22 extends from chamber 14 through the casing 18 and bracket 20 where shown in Figs. 2 and 4.

In the wall of the container 1 and at points adjacent to the connection of partitions 3 and 16 with said wall (see Fig. 3) are imbedded or molded flat head metal studs or chaplets 23, each chaplet having a threaded stud 24 to project through the casing 18 and by means of a washer 25 and nut 26 hold the container 1 stationary and in contact with said casing 18 at the points opposite the partitions 3 and 16. The stud 24 where it extends through the casing 18 is encased in a rubber tit 27 extending from the container 1.

In the front elevation of my device as shown in Fig. 1 it will be seen that the movement of the spindle 6 and spool flange 9 is allowed for by a greater space 28 between the flange 9 and the casing 18 than the space 29 between the flange 9 and cover 19 as the weight of the car is carried by air in the upper chamber 14 while the rebound of the car is snubbed by air in the lower chambers 15. The movement of the spindle 6 up in relation to the casing 18 will raise the partition 3 and compress the air in chamber 14 so the front and rear walls 2 and 2 will be distended through the front and rear openings 30 in casing 18 and the air in chamber 14 forced through the openings 13 in partition 3 into chambers 15.

In this raising of spindle 6 the horizontal partition 3 will be stretched but the walls of the container 1 opposite the partition 3 are prevented from being pulled away from the casing 18 by the imbedded chaplets 23. The bottom of the wall of the container 1 opposite the vertical partition 16 is also held to the casing cover 19 by an imbedded chaplet 23 when the said vertical partition 16 is stretched by the upward movement of spindle 6. In the downward movement of spindle 6 the partition 16 is compressed as well as the air in chambers 15 and the air is then forced up into chamber 14 through openings 13 while the front and rear portions of container below flange 9 are distended through the front and rear openings 31 in the casing 18.

To properly confine the container 1 in the casing 18 and give side stability of a car body in relation to the wheels and axles the casing 18 and cover 19 where joined extend nearly around container 1 opposite the spindle 6 and form stops 32 against which the flange 9 of spool 5 can abut in case of any excessive forward and backward movement of said spindle 6 in relation to the casing 18. The container 1 is molded at 32 to enclose the spool flange 9 and so form a rubber contact for stops 32. The side stability of the axle in relation to the car frame is taken care of by the flanges 9 of the spool 5, 5 acting on the partition 3 and the stops 32 enclosing the casing 18 opposite said partition. Hence the partition 3 while serving to divide the air container 1 into compartments is also particularly a stabilizing support.

In a driving or braking effort the spindle 6 will move forward or backward against the partition 3, compressing one part and stretching the other part and the vertical partition 16 acts on the air in one of the chambers 15. Where deemed necessary other partitions extending from the boss 11 can be inserted to obtain the desired amount of driving and braking effect and also a springing and snubbing effect and torque absorber.

The construction and location of partition 3 reduces undesirable forward and backward movement in driving and braking the car and the side thrust in turning, while leaving the up and down movement practically free to spring the car weight and snub its rebound. On account of the floating of the spindle, and hence the axle, carried by the partition in my cushioning device, shocks are absorbed from any direction when encountered.

Referring to Figs. 9 and 10 my cushioning device A is preferably shown to be installed on an automobile in pairs, i. e. two of the A devices replace the ordinary half elliptic spring, or four pairs to a car and the two pairs on the rear axle act the same as a Hotchkiss drive, i. e. driving through the cushioning device A while absorbing the driving torque. Using a pair of the devices A as shown attached to an axle reduces the size which would be necessary if only one centered on the axle were used and they form a couple to more efficiently absorb the driving torque.

On each side member of a frame 21 where it crosses the front axle 34 and the rear axle 35, a pair of casings 18 is attached, one of said pair in front of an axle and one in the rear of said axle. An axle is connected to a pair of air containers in the casing by means of a yoke 36 located on and attached to an axle in place of the usual spring. The yoke 36 has a pair of spindles 6 on which a spool 5, 5 is mounted for holding the air container 1 as detailed in Figs. 1 to 4. In Figs. 13 and 14 is shown the yoke 36 with its pair of spindles 6 and 6.

The air container of each device A can be separately inflated or as shown in Figs. 9 and 10 can be inflated from a single valve as 37 in the air line 38 connecting the different devices A, and the pressure shown on a gauge 39 on the instrument board 40.

The usual rubber bumpers (not shown) between the axles 34 and 35 and frame 21 can be used to support the frame on an axle in case of the deflation of an air container from any cause or from excessive movement of the car body in reference to the axles.

The downward thrust of the weight of a car on my cushioning device will act through the casing 18 on top of the air container 1 on the air in the chamber 14 and will be opposed by the upward supporting thrust of the axle through the spindle 6 to react by means of the partition 3 on said air. An upward thrust of the car axle as caused by a wheel hitting an obstruction on the road will flex the partition 3 upward and stretch the partition 16 and compress the air in the chamber 14 to carry the car body upward and at the same time forcing air into the lower chambers 15, 15 through the opening 13. When the axle and body separate the partition 3 is flexed downward and partition 16 compressed to force air from chambers 15, 15 into chamber 14. The greater load of car and passengers is resiliently supported by the air in the larger upper chamber 14 and the lesser load, as rebound of the axle, is taken care of by the air in the smaller lower chamber.

In Fig. 11 is shown a railway carriage truck in which 41 is the frame to which is attached a pair of my cushioning devices A. 42 is the wheel, and 43 the wheel bearing box which slides in the groove 44 of the guide 45. A support 46 resting on the front and rear wheel bearing boxes 43 supports a yoke 36 with the spindles 6 and 6 to obtain the cushioning action of the railway truck frame 41 on the wheels 42 through the air container in the devices A and A the same as described for the automobile.

In Fig. 12 the air cushioning device is shown in which a single unit A is used on each side of a vehicle chair 47. In this case the device A is shown as having the elliptical shape of the container and casing horizontal and as being inverted i. e. the casing 18 attached to the floor and the chair supported through the partition 3 in the air container by means of the spindle 6 as detailed in Figs. 1 to 8. The chair 47 is resiliently supported by means of an air container on each side thereof and said chair can be tilted back and resiliently supported by the action of the spindle 6 and spool 5, 5 in the partition 3, through the keys 7, 7 and lugs 8, 8 (Figs. 3 and 4).

It will be noted that the torque of the spindle 6 in the case of the chair with single units A is resisted by the twisting of the partitions in container 1 while the torque of the rear axle of an automobile where units A are used in pairs as shown applied in Figs. 9 and 10 is resisted principally by the direct compression and extension of the vertical partition 16 as well as the action of the horizontal partition 3 on the air in the chambers.

If we assume the automobile body maintains a constant level with the road and it therefore is a so-called fixed part and the wheels hitting obstructions or dropping into depressions in the road, then the axles are the so-called moving part and my cushioning device being fastened to the fixed part by an inclosing casing, the moving part acts on the air in container through moving the horizontal partition up and down to compress said air in an upper or lower chamber and said moving part stretches or compresses a vertically disposed partition.

Having thus described my invention, I claim:

1. A pneumatic spring for vehicles comprising a casing and cover, means to attach said casing to a vehicle frame, a resilient air container in said casing and cover comprising an upper large chamber and a small lower chamber, a partition between said chambers and below the center of said container, means to form an air passage between said upper and lower chambers and means in said partition extending transversely through said container to connect said spring to the axle of said vehicle.

2. A pneumatic cushioning device comprising an air container having a sealed wall of flexible material, means to connect the wall of said container to one of two relatively moving parts, a partition of flexible material separating said container into chambers, means to connect the other of said two relatively moving parts into said partition through said wall, said partition separated from said wall next to said means connecting the moving part to said partition whereby a portion of said partition may be displaced in relation to said container wall.

3. A pneumatic cushioning device comprising sealed walls of flexible material, a partition of flexible material separating said device into chambers, and a boss as a portion of said partition extending across said device and attached to opposite walls, said partition separated from said walls next to said boss whereby the said walls attached to said boss are free to flex and move with said boss when said partition is flexed.

4. In a device of the character described, a resilient air container, a partition of flexible material separating said container into chambers, casing means to attach said container to one of two relatively movable parts, a spindle to attach said partition to the other of two relatively movable parts, and chaplet means to attach said container to said casing.

5. In a device of the character described, a resilient air container, a horizontal partition to separate said container into an upper chamber and a lower chamber, means to attach said container to a vehicle frame, means through said horizontal partition to attach said partition to the axle of said vehicle, a second partition at an angle to and between said horizontal partition and the wall of said container whereby the up and down movement of said axle and the attached horizontal partition will alternately compress and extend said second partition.

6. A pneumatic spring for vehicles comprising a pair of closed resilient air containers, each of said containers having a casing and means to attach said casing to the frame of said vehicle, each of said containers divided into chambers by a flexible partition, a yoke connected to the axle of said vehicle and having a spindle for the partition of each of said air containers, flange means on said spindles to stabilize the side thrust of said axle and stop means on said casing to enclose the container in line with said partition and spindle.

7. In a device of the character described to cushion the movement of a movable part in relation to a stationary part, a resilient air container, a partition separating said container into chambers, means to attach said container to said stationary part and means extending transversely off-center to said movable part to attach said movable part to said partition whereby the torque of said movable part is absorbed by said device.

8. In a device of the character described to cushion the movement of a movable part in relation to a stationary part, a resilient air container, a partition separating said container into chambers, casing means to attach said container to said stationary part, means through said partition to attach said partition to said movable part and side stabilizing means on said casing means to absorb the side movement of said movable part.

9. A pneumatic spring for vehicles comprising a pair of air containers, each of said containers having means to attach said container to the frame of said vehicle, each container divided into chambers by a horizontal and a vertical partition, means to connect said containers in pairs to the axles of said vehicle through the partitions of each of said containers, whereby the driving, braking and torque of said axles is absorbed by said containers.

10. In a device to cushion the movement of a movable part in relation to a stationary part, a resilient air container having side walls, a boss extending through said container and attached to said walls, casing means to attach said container to said stationary part, means extending through said boss to connect with said movable part, means on said boss connection to act on said container in a side movement of said movable part and means on said casing to act on said container to check the side movement of said movable part.

11. In a device to cushion the movement of two relatively movable parts, an air container having walls, a boss extending through said container and attached to opposite walls, casing means to attach said container to one of said movable parts, means to connect said container through said boss to the other of said movable parts, stop means on said casing and resilient means on said boss connecting means to engage said casing stop means.

12. In a device to cushion the movement of two relatively movable parts, a resilient air container, partition means to separate said container into air chambers, means to inflate said chambers, means to attach said container to one of said movable parts and means to attach said partition means to the other of said movable parts whereby the movement of said parts toward and away from each other is absorbed by the air in said container, and means on each of said movable parts whereby the side displacement of said movable parts is absorbed by said container.

HERSCHEL D. SMITH.